Feb. 16, 1965   K. HUGENTOBLER   3,169,276
MOLD

Filed May 15, 1963   2 Sheets-Sheet 1

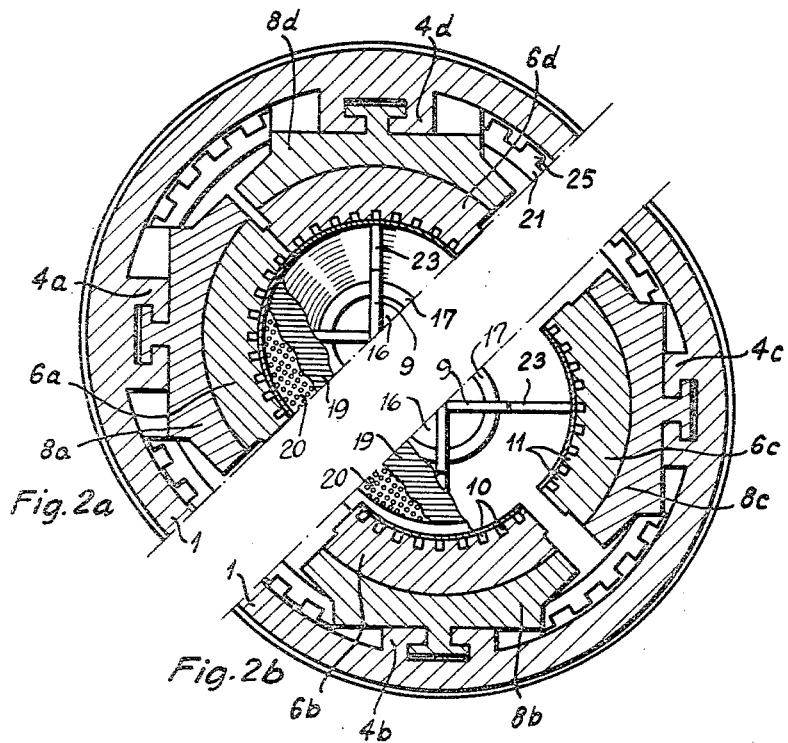
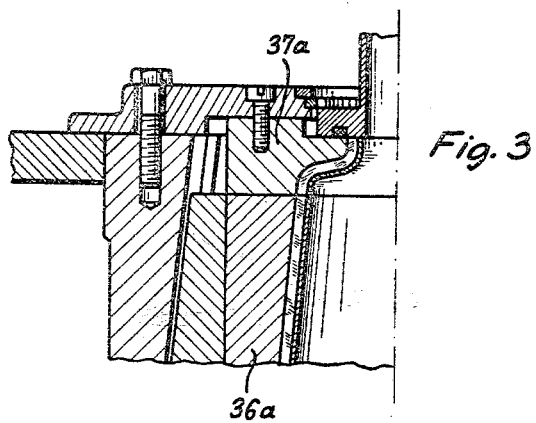

United States Patent Office 3,169,276
Patented Feb. 16, 1965

3,169,276
MOLD
Kurt Hugentobler, Onex, Geneva, Switzerland, assignor to Etablissements G. Lesieur et Ses Fils, Paris, France, a firm
Filed May 15, 1963, Ser. No. 280,548
12 Claims. (Cl. 18—34)

This invention relates to a mold for molding a hollow object under pressure.

An object of the invention is to provide a mold capable of releasing and extracting the object in a single operation, thereby to render the mold suitable for inclusion in an automatic molding machine. A further object of the invention is to provide a mold which is particularly suitable for the manufacture of bottles or like containers from a suspension of fibrous matter, for example wood pulp, but which may also be used for pressure-molding fluid materials in general.

In an automatic molding machine, it is important that the mold can first open a little to release the molded object, that at least one of its parts can be retracted to permit the extraction of the molded object and that the mold can reclose in preparation for the next molding operation and reconnect itself to the injection device, which operations must be carried out automatically and rapidly.

The invention accordingly provides a mold for molding a hollow object under presure, said mold comprising a sleeve-like mandrel having a vertical axis; a base assembly forming the bottom of the mandrel and vertically movable relatively to the mandrel; a hollow die having an inner configuration corresponding to the outline of the object to be molded, said die having a support seated on said base assembly for supporting said object and radially movable sidewall parts; interengaging slide means on the inside of the mandrel and on each of said side-wall part, said slide means having inclined axes meeting at a point along said vertical axis above said mandrel to move said side-wall parts radially away from said object upon downward movement of the die and of the base assembly relatively to the mandrel to extract said object upon completion of a molding operation; releasable locking means between the mandrel and the base assembly to hold the base assembly in position relatively to the mandrel during a molding operation; and retaining means for preventing the side-wall parts of the die from moving downward relatively to the mandrel beyond a predetermined point and from becoming disengaged from the mandrel during an extraction operation.

Figures 1A, 1B:
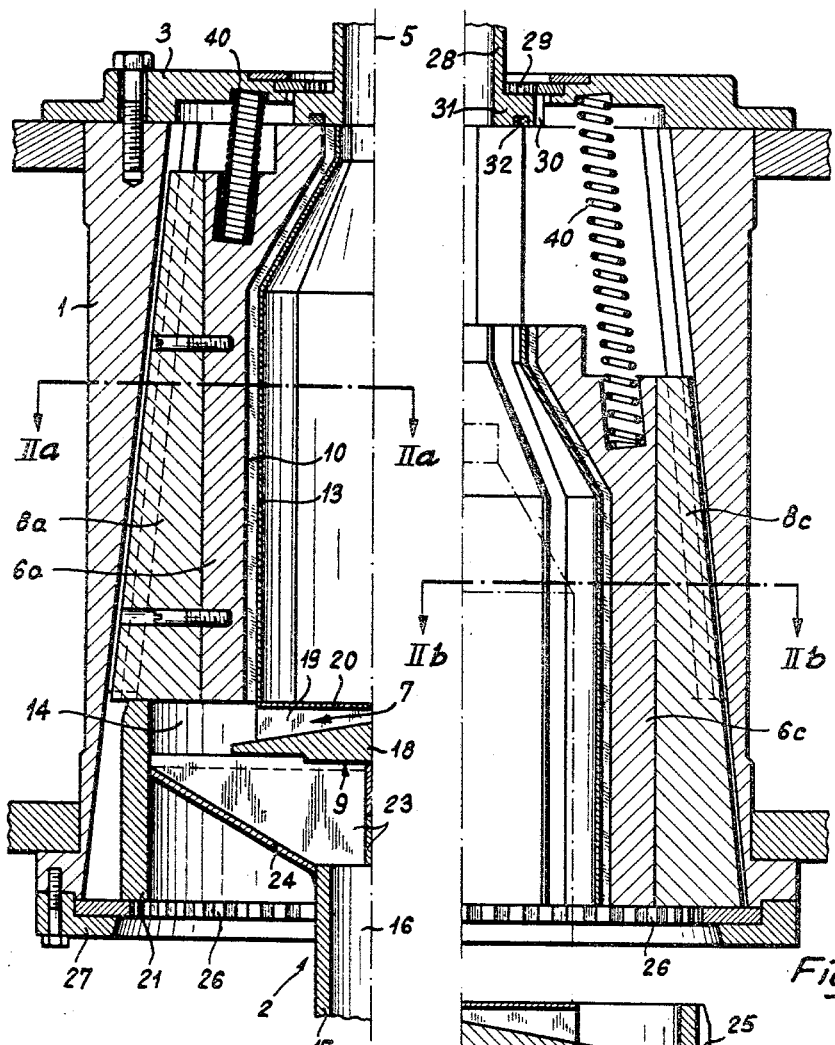
Figure 1C:
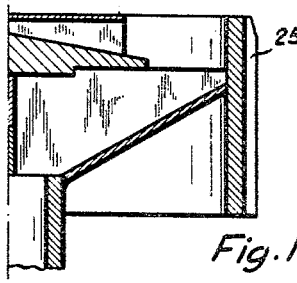

For a better understanding of the invention and to show how the same may be carried into effect, several embodiments thereof will now be described by way of example with reference to the accompanying drawings in which:

FIGURES 1a, 1b and 1c are axial sections of the apparatus of the embodiment, FIGURE 1a being a left side showing the mold closed, FIGURE 1b the right side showing an upper portion of the mold in open position, and FIGURE 1c being in a relative position to FIGURE 1b and thus representing a lower portion of the mold in open position;

FIGURES 2a and 2b respectively are sections on lines IIa—IIa and IIb—IIb of FIGURES 1a and 1b; and;

FIGURE 3 represents in fragmentary axial sectional view a detail of modification of the apparatus of the preceding figures of the drawing.

The illustrated mold comprises a hollow sleeve-like mandrel 1 having a vertical axis 5, a vertically movable base assembly 2 forming the bottom of the mandrel and an annular cover 3. The mandrel 1 has a plurality of grooved slides of which four are shown in FIGURES 2a and 2b at 4a, 4b, 4c and 4d. The slides are inclined relative to the axis 5 of mandrel 1 so that their axes meet at a point, not shown, along axis 5 above cover 3. The base assembly 2 includes crossed webs 23 secured to a drive stem 17 for axially displacing assembly 2. The crossed webs 23 are moreover housed in a funnel-shaped casing 24 emptying into a drainage passage 16 extending axially through the stem 17 to which casing 24 is fixed. The casing 24 and crossed webs 23 have secured thereto a sleeve-like guide member 21.

The illustrated mold moreover comprises a die having a side-wall, consisting of four parts 6a, 6b, 6c and 6d, and a bottom 7. The die cooperates with the mandrel through four intermediate members 8a, 8b, 8c and 8d, which are formed with ribs engaging in the grooved slides 4, which intermediate members enable the side-wall parts 6 to be slidably mounted in and held by the mandrel 1. The ribs of members 8 and the grooves in slides 4 have, for example, a dovetail form, such that the ribs cannot drop out radially from the slides. The bottom 7 of the die is formed by a circular plate 18 maintained in position on the mobile base assembly 2 by an increased thickness portion on the underface of the plate 18 and seated in corresponding recesses 9 in the crossed webs 23.

Each of the side-wall parts 6 is formed with longitudinally extending grooves 10, separated by narrow lands 11 and are lined with filter means 13, made, for example, from perforated sheet metal. The grooves 10 are preferably each co-planar with the axis of the mandrel 1 and lead to an annular collector chamber 14 communicating with drainage passage 16 via funnel 24. The plate 18 is formed with parallel drainage grooves 19 having sloping bottoms and separated by narrow lands which carry a circular filter 20.

The sleeve-like guide member 21 of the mobile base assembly 2 is formed on its outer surface with axially directed grooves 25 arranged to mate with crenellations formed along the inner edge of a ring 26 which is rotatably carried underneath mandrel 1 by a flanged annulus 27, the rotation of the ring 26 relative to the mandrel being carried out by drive means, not shown. This arrangement constitutes a locking system designed to hold the mobile base assembly 2 in the position shown in FIGURE 1a. The ring 26 further serves as a retaining device for preventing the members 8, and hence side-wall parts 6, from dropping out of the mandrel 1 when the base assembly 2 is withdrawn. A locking system similar to that described above is also provided at the top end of the mold for releasably locking to the annular cover 3 a tube 28 through which the material to be molded is injected. This latter locking system comprises an internally crenellated rotatable ring 29 mounted in the cover 3 and maintained therein against axial movement. The crenellations of ring 29 are arranged to mate with grooves 30 formed in the periphery of a flange 31 at the lower end of tube 28. A sealing ring 32 is provided in flange 31 to ensure fluidtightness between the die side-wall parts 6 and flange 31 against which the side-wall parts 6 are pressed for a molding operation.

The illustrated mold operates as follows:

When the mold is ready for a molding operation, the mobile base assembly 2 is in the upper position and locked in place by the ring 26 (FIGURE 1a). The injection tube 28 is then introduced and applied to the top of the die where it is locked in place by the ring 29, whereupon the material to be molded is injected. When the injection operation is ended, the injection tube 28 is unlocked and withdrawn. The release of the molded object starts with the unlocking of the mobile base assembly 2 and continues with the lowering of the assembly. During this lowering movement, the members 8 move downward under the effect of their own weight and, since the slides 4 diverge, this movement causes the die side-wall parts 6 to separate and move away from the molded object. The latter, being supported by the die bottom 7, is lowered at the same speed as the die side-wall parts 6. Consequently, the only relative movement between the molded object and the die side-wall parts is radial, to the exclusion of any relative axial movement or slipping. When the members 8 come to abut against the ring 26, the motion of the die side-wall parts 6 is stopped. The mold now being open, subsequent lowering of the mobile base assembly 2 extracts the object which continues to rest on the die bottom 7. The object is then removed, whereupon the mobile base assembly 2 is returned to its initial raised position, thus reclosing the mold by moving the members 8 and by being locked in place. The next molding operation can then begin. When the material to be molded is an aqueous suspension of fibrous matter, the excess water drains out through the holes in the filter means 13 and 20, runs into the funnel 24 via the grooves 10 and 19 and the annular chamber 14, and is removed through passage 16 in stem 17.

The mold described lends itself particularly well to automatic molding operations, since one movement only is required to carry out very quickly the simultaneous release and extraction of each object, while the reverse movement recloses the mold.

Various modifications may be made to the illustrated embodiment. For example, if the upper surface of the object to be molded is very slightly inclined relatively to the horizontal plane, it is often advantageous to separate the top portion of the die from the remainder thereof. This is shown in FIGURE 3, wherein the die includes an annular top portion 37 secured to the underside of the cover 3 and engaged by the side-wall parts 6 of the die for a molding operation.

In order to facilitate the release of a molded object, it is often advantageous to fit between the cover 3 and the die side-wall parts 6, elastic means 40 (see FIGURES 1a and 1b) to urge the die side-wall parts 6 and the members 8 toward the mobile base assembly 2.

The locking system for the injection tube 28 could be replaced by a pressure applied continuously during a molding operation against the top face of the flange 31 by, for example, the drive means, not shown, which move the injection tube.

The present embodiment is that of a mold using filter means, designed for molding materials containing excess liquid. The illustrated mold can, however, also be used for other products, for example plastics. In such an event, parts 6 and 7, having grooves and lined with filter means, are replaced by other parts whose surfaces are adapted to the material to be molded.

In the case of a mold using filter means, it is advantageous to make the filters 13 and 20 from trellis, from porous material or to adopt some other arrangement capable of performing the function of filter means.

The drainage grooves 10, which are co-planer with the axis of the mandrel 1, can take any form provided that they lend themselves to the discharge of excess liquid and lead into a collector such as the chamber 14. In the same way, the shape of the grooves 19 is unimportant so long as they lead into the collector.

The crenellated ring locking systems have been described only by way of example. It is clear that a number of other known locking means could be resorted to.

Furthermore, it does not matter whether the slides 4 have grooves and the parts 8 the corresponding ribs or whether the converse arrangement is resorted to. Similarly, the shape of the grooves and ribs is of no importance. The determining factor is that the relatively sliding parts of the mandrel and of the die do not become parted during movement.

I claim:

1. In a mold having an inlet for fluid and a mold cavity communicating with the inlet when the mold is closed, the improvement which comprises, a plurality of movably mounted mold side sections to be shifted radially between positions corresponding to open and closed positions of the mold, and end structure engaging first adjacent ends of said movably mounted side sections to shift said side sections radially to position corresponding to closed position of the mold and having a mold end section forming the mold cavity with said side sections when the mold is closed, said side sections in position corresponding to closed position of the mold having second adjacent ends sealingly engaged with the mold inlet and forming an opening communicating with the mold inlet for fluid to be supplied to the mold cavity.

2. In a mold having an inlet for fluid and a mold cavity communicating with the inlet when the mold is closed, the improvement of claim 1, wherein said support and end structure are provided having detachably interengaging portions for maintaining said support and said end structure interengaged when said end structure is in position corresponding to closed position of the mold, and the mold has elastic means in compressed engagement with each of said mold side sections and said support when the mold is closed and biasing the mold toward open position.

3. In a mold having an inlet for fluid and a mold cavity communicating with the inlet when the mold is closed, the improvement of claim 1, wherein said mold side sections and mold end section each includes mold and filter means having a molding and filtering face and passages for exuding fluid from the mold cavity during a molding operation, and said end structure has a basin communicating with said passages to receive the fluid exuded.

4. In a mold having an inlet for fluid and a mold cavity communicating with the inlet when the mold is closed, the improvement which comprises, a support, a plurality of mold side sections, said support and side having interconnecting portions including diverging guides and corresponding slides, and each of said guides and corresponding slide having components interlocking laterally of said guide and being relatively movable longitudinally of said guide for said mold side sections to be shifted radially between positions corresponding to open and closed positions of the mold, and end structure engaging first adjacent ends of said movably mounted side sections to shift said side sections to position corresponding to closed position of the mold and having a mold end section forming the mold cavity with said side sections when the mold is closed, said side sections in position corresponding to closed position of the mold having second adjacent ends sealingly engaged with the mold inlet and forming an opening communicating with the mold inlet for fluid to be supplied to the mold cavity.

5. In a mold having an inlet for fluid and a mold cavity communicating with the inlet when the mold is closed, the improvement of claim 4 comprising, releasable locking and retaining means for said mold side sections to be supported during a molding operation and for the object and said end structure to be retained, said locking and retaining means including retaining means on said support and engaging said mold side sections for preventing said side sections from moving relatively to said support beyond a predetermined point and from becoming disengaged from said support when the object is being extracted, and releasable locking means having relatively movable portions securely on said support and securely on said end structure, to hold said end structure in a position relatively to said support during a molding operation, and for those of said portions of said locking means securely on said support to be clear of the object and said end structure when the latter and the object are being extracted.

6. In a mold having an inlet for fluid and a mold cavity communicating with the inlet when the mold is closed, the improvement of claim 5, wherein said retaining means supports said releasable locking means.

7. In a mold having an inlet for fluid and a mold cavity communicating with the inlet when the mold is closed, the improvement of claim 4, wherein said mold side sections include as detachably secured portions, the portions of said interengaging slide means corresponding thereto.

8. In a mold having an inlet for fluid and a mold cavity communicating with the inlet when the mold is closed, the improvement of claim 4, wherein the axes of said diverging guides have an inclination causing said mold side sections to move relatively to said support under the effect of their own weight during an extraction of the molded object.

9. A mold for molding a hollow object under pressure, said mold comprising a hollow downwardly open mandrel having a vertical axis; a die side-wall having an inner configuration corresponding to outline of the object to be molded, said die wall having movable side-wall parts within said mandrel, said parts and said mandrel including interengaging slide means respectively on the outside and inside thereof, said slide means having downwardly and outwardly inclined axes meeting at a point along said vertical axis above said mandrel to guide said side-wall parts downwardly and radially away from the object, and a base assembly at the lower end of said downwardly open mandrel and vertically movable into said mandrel, said base assembly including a die member for supporting the object before and during extraction, and a sleeve-like member engaging said side-wall parts and supporting the same during a molding operation, and said mandrel having releasable locking and retaining means securely thereon, said releasable locking and retaining means including, retaining means for preventing said side-wall parts from moving downward relatively to said mandrel beyond a predetermined point and from becoming disengaged from said mandrel when the object is being extracted, and releasable locking means to hold said base assembly in position relatively to said mandrel during a molding operation, said locking means including a rotatable ring held to said mandrel against axial displacement relatively to said mandrel, and said ring and said sleeve-like member having interengageable portions for allowing relative sliding movement between said ring and said sleeve-like member in a first angular position of said ring and for blocking said relative sliding movement in a second angular position of said ring when said sleeve-like member is raised above said ring.

10. A mold for making a hollow object under pressure, said mold comprising a hollow downwardly open mandrel having a vertical axis and a centrally open cover, a die side-wall having an inner configuration corresponding to outline of the object to be molded, said die side-wall having radially movable side-wall parts within said mandrel, said parts and said mandrel including interengaging slide means respectively on the outside and inside thereof, said slide means having downwardly and outwardly inclined axes meeting at a point along said vertical axis above said mandrel to guide said side-wall parts downwardly and radially away from the object, a base assembly at the lower of said downwardly open mandrel and vertically movable into said mandrel, said base assembly including a die member for supporting the object before and during extraction, and supporting means engaging said side-wall parts and supporting the same during a molding operation, and said mandrel and said base assembly having releasable locking and retaining means, the latter said means including, retaining means for preventing said side-wall parts from moving downward relatively to said mandrel beyond a predetermined point and from becoming disengaged from said mandrel when the object is being extracted, and releasable locking means to hold said base assembly in position relatively to said mandrel during a molding operation, and the mold further including an injection tube having a flanged end portion receivable through the central opening of said cover and sealingly engaging said die side-wall for a molding operation, and a rotatable locking ring held in said central opening of said cover against axial displacement relatively to said mandrel, said locking ring and flanged portion of said tube having interengageable portions for allowing relative sliding movement between said locking ring and said flange in a first angular position of said locking ring and for blocking said relative sliding movement in a second angular position of said locking ring when said flanged portion is lowered below said locking ring.

11. A mold as claimed in claim 10, further comprising spring means between said cover and each said side-wall part to urge said side-wall parts away from said cover during an extraction operation.

12. A mold as claimed in claim 10, wherein an extension of said cover forms an upper die portion, and said upper die portion is engaged by said die wall for a molding operation.

References Cited by the Examiner
UNITED STATES PATENTS

| | | | |
|---|---|---|---|
| Re. 19,780 | 12/35 | McKay et al. | |
| 1,660,411 | 2/28 | Bodor. | |
| 1,871,296 | 8/32 | Battin | 18—41 |
| 1,948,607 | 2/34 | Abbott | 18—41 |
| 1,964,709 | 6/34 | Winnertz. | |

WILLIAM J. STEPHENSON, *Primary Examiner.*